Jan. 25, 1927.
C. C. FARMER
1,615,367
FLUID PRESSURE BRAKE
Filed Feb. 20, 1925
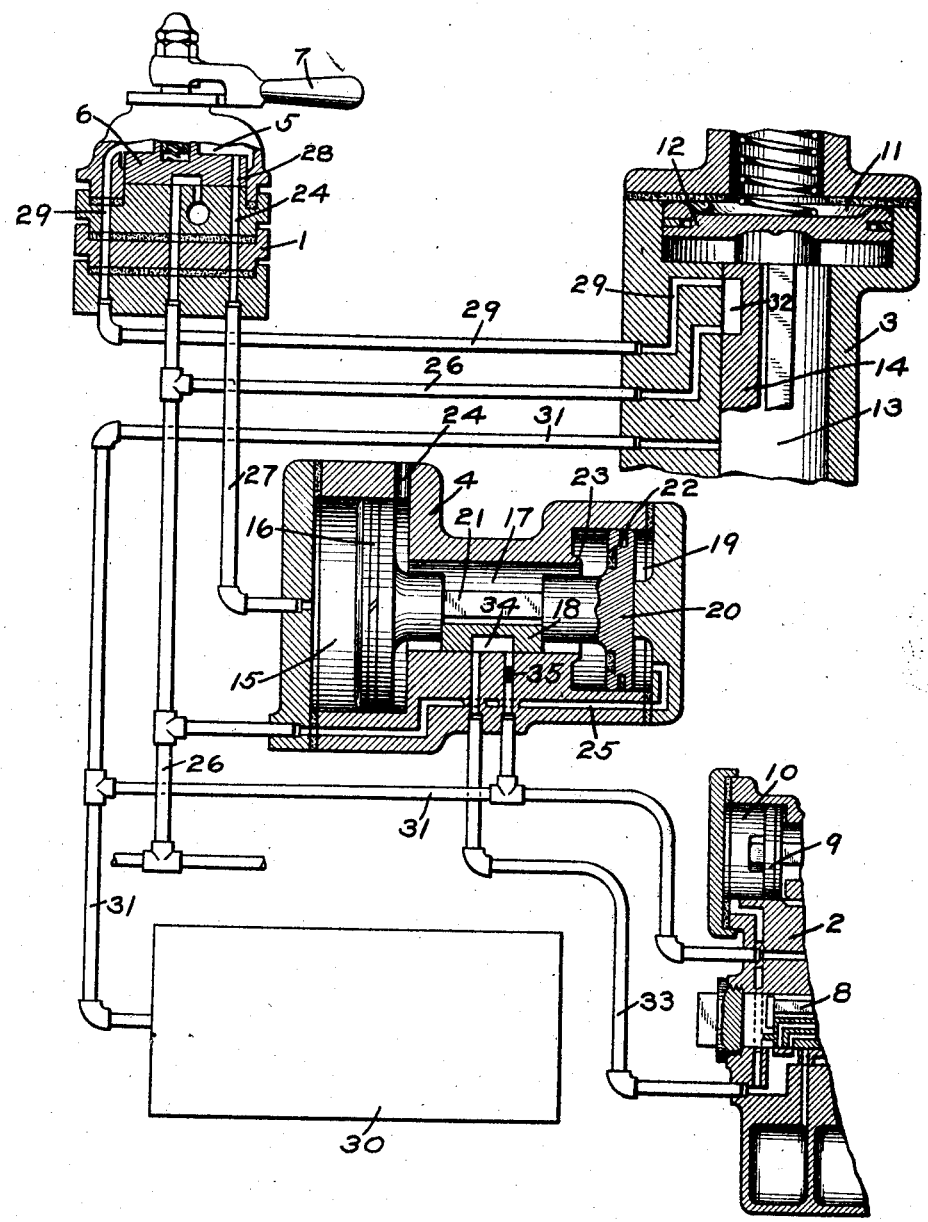
INVENTOR
CLYDE C. FARMER
BY Wm. M. Cady
ATTORNEY Patented Jan. 25, 1927.

1,615,367

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed February 20, 1925. Serial No. 10,598.

This invention relates to fluid pressure brakes, and more particularly to a locomotive brake equipment.

In a well known locomotive brake equipment, a distributing valve device is employed comprising an application portion having an application cylinder and an equalizing portion operating upon a reduction in brake pipe pressure for supplying fluid under pressure to the application cylinder to thereby operate said application portion to effect an application of the brakes.

The automatic brake valve employed with this equipment is provided with a port for supplying fluid at main reservoir pressure to the application cylinder of the distributing valve device when moved to emergency position to effect an emergency application of the brakes, so as to ensure the maintaining of full pressure in the application cylinder.

With certain automatic train control systems such, for example, as that shown in Patent No. 1,492,613 of T. H. Thomas, dated May 6, 1924, an application valve device is employed which is adapted in normal release position to establish communication from the main reservoir to the rotary valve chamber of the automatic brake valve device, but when the application valve device is shifted to brake application position, the main reservoir communication to the rotary valve chamber is cut off and said chamber is connected to the brake pipe.

It will thus be seen that with a locomotive brake equipment associated with an automatic train control system of the above type, if the brake valve should be moved to emergency position at a time that the application valve device of the automatic train control system is in brake application position, the pressure in the application cylinder will not be maintained as in the ordinary locomotive brake equipment.

The principal object of my invention is to provide means in connection with an automatic train control system associated with a locomotive brake equipment having an application cylinder for maintaining the pressure in said cylinder.

In the accompanying drawing, the single figure is a diagrammatic view, partly in section, of so much of an automatic train control system and a locomotive brake equipment as is necessary to illustrate the application of my invention and showing my improvment embodied therein.

The apparatus shown in the drawing comprises an automatic brake valve device 1, a distributing valve device 2, an application valve device 3 of an automatic train control system, and a controlling valve device 4.

The brake valve device 1 comprises a casing having a rotary valve chamber 5 containing a rotary valve 6, said valve being operated by the usual handle 7.

The distributing valve device 2 comprises a casing containing an equalizing portion 8, (shown in part) and an application portion (shown in part) and including an application piston 9 contained in application cylinder 10.

The application valve device 3 (shown in part) comprises a casing having a piston chamber 11, containing a piston 12 and a valve chamber 13 containing a slide valve 14, adapted to be operated by piston 12.

The controlling valve device 4 may comprise a casing having a piston chamber 15 containing a piston 16, a valve chamber 17 containing a slide valve 18, and a piston chamber 19, containing a valve piston 20. The piston 16 is connected to the valve piston 20 by a piston stem 21, the movement of which is adapted to operate the slide valve 18. The valve piston 20 is of less area than the piston 16 and is provided with a seat 22 adapted to engage a seat ring 23. The valve chamber 17 is open to the atmosphere through an exhaust port 24 and piston chamber 19 is connected by a passage 25 to the usual brake pipe 26.

In emergency application position, as shown in the drawing, pipe and passage 27, leading to piston chamber 15 is connected through a port 28 in the rotary valve 6 with rotary valve chamber 5, while in other positions of the brake valve, said pipe and passage are connected to the atmosphere.

In operation, with the brake valve in running position or other position, except emergency application position, the pipe 27 is blanked at the brake valve, and since piston chamber 19 is connected to the brake pipe, the brake pipe pressure on valve piston 20 will move and hold the valve piston seated on the seat ring 23, which prevents possible leakage from the brake pipe around the valve piston.

In release position, the application piston 12 and the slide valve 14 are in their innermost positions, in which the slide valve 14 uncovers a passage and pipe 29 which leads to the rotary valve chamber 5 of the brake valve device. The usual main reservoir 30 is connected through pipe 31 with the valve chamber 13, so that in release position of the slide valve 14, fluid under pressure is supplied from the main reservoir 30 through the valve chamber 13 to the rotary valve chamber 5.

If the automatic train control apparatus should be operated, the piston 12 of the application valve device 3 will be shifted to its outer extreme position, as shown in the drawing, moving the slide valve 14 so that pipe 29 is connected through a cavity 32 in the slide valve with the brake pipe 26, so that the rotary valve chamber 5 will now be supplied with fluid at brake pipe pressure.

If an emergency application of the brakes is effected by moving the brake valve to emergency position, the pipe 27 will be connected through port 28 in the rotary valve 6 with the rotary valve chamber 5, so that fluid at brake pipe pressure will be supplied to the piston chamber 15. Although the piston chamber 19 also contains fluid at brake pipe pressure, the moving parts of the controlling valve device will be shifted to the position shown in the drawing, due to the differential area of the piston 16.

In this position, pipe 33, leading to the application cylinder 10 of the distributing valve device 2 is connected, through a cavity 34 in slide valve 18 with main reservoir pipe 31, so that the pressure in the application cylinder 10 is now maintained by flow from the main reservoir 30. The communication through which fluid is supplied from the main reservoir to the application cylinder may contain a choke plug 35 having a restricted port, so as to limit the rate of flow to the application cylinder.

When the brake valve handle 7 is moved to release position to release the brakes, the pipe 27 and the piston chamber 15 are cut off from the fluid pressure supply, so that the brake pipe pressure acting in piston chamber 19 will shift the differential piston device and the slide valve 18 back to normal position.

Having now described my invention, what I claim as new and desire to secure by Letters Patent, is:—

1. In a locomotive brake equipment, the combination with a valve device for effecting an application of the brakes and having an application cylinder, a brake valve device and a source of fluid under pressure, of a valve device operating upon movement of said brake valve device to emergency position for supplying fluid from said source to said application cylinder.

2. In a locomotive brake equipment, the combination with a brake pipe, a valve device having an application cylinder, and a source of fluid under pressure, of a valve device comprising differential pistons subject on one side to brake pipe pressure and a slide valve operated by said pistons for controlling communication from said source of fluid pressure to said application cylinder, and a brake valve device for controlling the fluid pressure on the opposite side of said pistons.

3. In a locomotive brake equipment, the combination with a brake pipe, a valve device having an application cylinder, and a source of fluid under pressure, of a valve device comprising differential pistons subject on one side to brake pipe pressure and a slide valve operated by said pistons for controlling communication from said source of fluid pressure to said application cylinder, and a brake valve device adapted in emergency position for supplying fluid under pressure to the opposite side of said pistons.

4. In a locomotive brake equipment, the combination with a brake pipe, a valve device having an application cylinder, and a source of fluid under pressure, of a valve device comprising differential pistons subject on one side to brake pipe pressure and a slide valve operated by said pistons for controlling communication from said source of fluid pressure to said application cylinder, an application valve device associated with an automatic train control system, and a brake valve device having a valve chamber containing a rotary valve, said application valve device being adapted in application position to supply fluid from the brake pipe to said valve chamber and said brake valve device being adapted in emergency position to connect the valve chamber with the opposite side of said pistons.

In testimony whereof I have hereunto set my hand.

CLYDE C. FARMER.